United States Patent Office 3,236,403
Patented Feb. 22, 1966

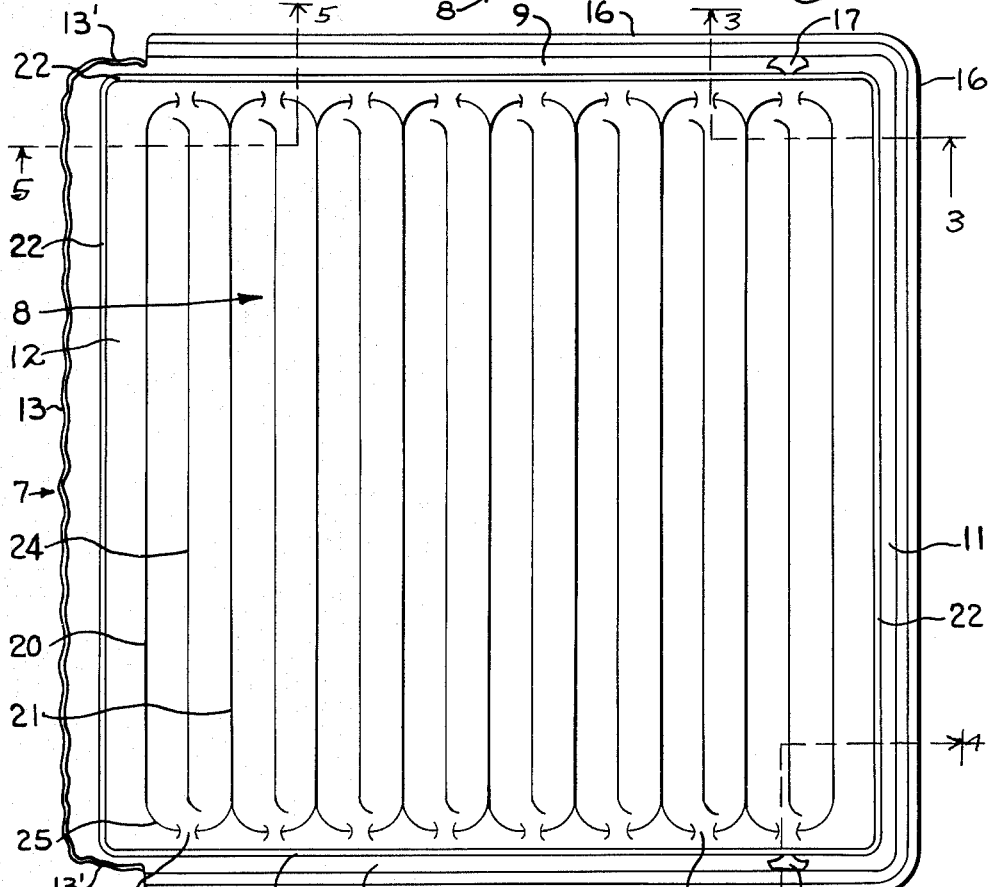

3,236,403
FOOD STORAGE AND COOKING TRAY
Hyman A. Steinberg, 7—25 166th St.,
Whitestone 57, N.Y.
Filed Feb. 19, 1963, Ser. No. 259,632
4 Claims. (Cl. 220—1)

This invention relates to a metal tray for storage of frozen food and/or for use in cooking and the like. More specifically, it relates to a tray made of aluminum foil or similar material, and having a foldable upwardly-projectable flap extending from one end and including a portion of the two adjoining sides of the tray. The invention also includes raising means on at least one of the unflapped sides, thereby providing a tilting position for the tray. A further feature includes drainage means at the sides of the corrugations for drainage of juices.

At the present time, trays of aluminum foil are marketed for holding food which may be cooked therein. Such trays usually are made square or rectangular in shape, and they have a corrugated bottom bounded by a raised lip beyond which is a shallow well adjacent the walls of the trays. Although such trays have found extended use in recent years, housewives have encountered difficulties in spooning out juices and gravies therefrom because, when such trays are tilted for the spooning operation, it is difficult to remove the gravy therefrom without spilling at least some. Also, juices collect in the corrugations at the bottom of the tray and their presence there during the cooking operation causes spattering and smoke, which is annoying and dangerous in ordinary ovens.

According to the present invention, a tray is provided which eliminates all of the aforesaid disadvantages, and provides additional advantages, as will become apparent from the description which is to follow. The invention will be understood more readily by reference to the accompanying drawing in which a preferred embodiment is described, and in which FIGURE 1 depicts a side view of a molded tray made in accordance with the present invention. FIGURE 2 illustrates a top or plan view of the tray shown in FIGURE 1, while a cross-sectional side view of the corner taken along line 3—3 of FIGURE 2 is illustrated in FIGURE 3. A cross-sectional end view of the corner taken along line 4—4 of FIGURE 2 is shown in FIGURE 4. A cross-sectional side view of the flapped corner taken along line 5—5 of FIGURE 2 is presented in FIGURE 5. FIGURE 6 shows the same tray corner as that illustrated in FIGURE 5, but with flap folded inwardly, with tray in tilted condition for ladling out the gravy. Similar numerals refer to similar parts in the various figures.

Referring again to the drawing, numeral 7 represents generally the tray of the present invention, having corrugated bottom 8, raised sides 9 and 10, and raised sides 11 and 12. The tray 7 is made by pressing a sheet of aluminum foil in a mold of the shape shown. Side 12 has an extension in the form of an upwardly-directed flap 13 having a lateral scoring line 14 at its connection to side 12. Flap 13 also is made of the same material as that used for tray 7, and it extends across the entire length of side 12 and also across a small portion 13′ of sides 9 and 10, so that, when flap 13 is folded inwardly at scoring 14 (as in FIG. 6), the gravy or other juices 15 will be held intact in the receptacle formed by flap 13, end 12 and portions of sides 9 and 10. As is apparent from FIG. 6, the tray may be tilted over a fairly wide arc without spilling the liquid 15, which then may be ladled out, as desired. Side 11 and most of sides 9 and 10 may be provided with rim or flange 16. It will be understood that present trays, which do not have a flapped side, permit heating units, such as gas flames or electric coils, to radiate heat directly into the exposed fats and juices in the open tray, whereby considerable spattering and smoking takes place, and encouraging a dangerous fire hazard. In the present invention, however, the juices (particularly in the tilted trays), are protected by the reflective flap, thereby eliminating a considerable amount of spattering and smoking.

Another important feature of flap 11 is that, when it is removed from the mold in the upright position (as in FIG. 5), it can be nested vertically with other similar trays without difficulty, thus enabling the shipping and storage of large numbers of such trays without taking up excessive space.

A still further important feature of the present invention involves the provision of tilting means on at least one of the unflapped sides, such as indentations 17 and 18 on sides 9 and 10, respectively, adjacent unflapped side 11, and near bottom 8 so as to provide downward projections 19 which are designed to raise side 11, thus tilting tray 7 slightly toward flapped side 12. Although one indentation on one side may be employed, it is preferred to have one on each side, and these inward indentations 18 preferably are oval or egg-shaped, the forming of which causes peripheral edge of bottom 8 to project downwardly still further thus providing a short leg 19 at that point. Another tilting means can be one or more similar indentations on side 11, which is opposite flapped side 12.

It will be noted that the corrugations in bottom 8 are parallel to flapped side 12, thus serving to prevent slipping of food which may be tilted toward the adjacent sides. The first corrugation 20 is raised sufficiently so that succeeding corrugations 21, etc., are raised above peripheral edge 8′ of bottom 8 which latter forms a continuous well 22 (FIG. 5) circumscribing walls of the tray. Normally, corrugations 20–21, for example, would also form a shallower well 24 in which juices would remain in conventional trays. However, in the trays of the present invention, the ends 25 of the wells are provided with downwardly-directed indentations 26 (FIGS. 1 and 5) which enable the juices from corrugation wells 24 to flow out, toward sides 9 and 10, into well 22, so that little juice would be left therein to spatter and form smoke.

It has been found that a suitable tray may be made by molding a sheet of aluminum foil into a tray having a bottom about 9″ square and a top periphery about 10″ square. Flap 11 may extend across one end for a height of about ¾″, this extension continuing across each adjacent side for a length of about 1″. Indentations 18 may be about 1″ high and about ½″ across at their bottoms, and projections 19 would thus be about ⅛″ to ¼″ long, but insufficient to cause substantial overcooking of the raised side as compared to the lower side. The first corrugation 20 may be about ½″ above peripheral bottom edge 8′, while well 24 would be linearly about ¼″ below the top of corrugation 20.

I claim:
1. In a four-sided metal foil tray designed for holding foods which may be cooked therein, the improvement comprising,
a vertically-directed inwardly-foldable foil flap serving as an extension of one side of said tray and of a short length of each of the adjoining two sides, the remaining side and side portions being unflapped, and
a laterally-directed scoring line marking the boundary between said extended side and said flap, said flap having a width sufficient to confine fluids for spooning out within the tray where the flap is folded inwardly and the tray is tilted toward the flap end thereof.

2. In a four-sided metal foil tray having a bottom and designed for holding foods which may be cooked therein, the improvement comprising, a vertically-directed inwardly-foldable foil flap serving as an extension of one side of said tray and of a short length of each of the adjoining two sides, the remaining side and side portions being unflapped, a laterally-directed scoring line marking the boundary between said extended side and said flap, said flap having a width sufficient to confine fluids for spooning out within the tray where the flap is folded inwardly and the tray is tilted toward the flap end thereof, and an inward indentation disposed on the lower portion of at least one of the partially-flapped sides adjacent to the unflapped side, whereby a downwardly-directed projection is provided extending below the bottom whereby said tray is tilted downwardly toward the flapped side when resting on a flat surface.

3. A four-sided metal foil tray according to claim 2 in which an inward indentation is provided in the lower portion of each of the partially-flapped sides adjacent the unflapped side at a location near the fourth side, whereby said tray is tilted downwardly toward the flapped side.

4. In a four-sided metal foil tray having a bottom and designed for holding foods which may be cooked therein, and having a narrow peripheral well adjacent and circumscribing the sides, and a series of linear corrugations terminating with raised ends near said well, the improvement comprising, a vertically-directed inwardly-foldable foil flap serving as an extension of one side and of a short length of each of the adjoining two sides, the remaining side and side portions being unflapped, a laterally-directed scoring line marking the boundary between said extended side and said flap, said flap having a width sufficient to confine fluids for spooning out within the tray where the flap is folded inwardly and the tray is tilted toward the flap end thereof, an inward indentation in the lower portion of each partially-flapped side, whereby a short downward projection results at the bottom, and a downward indentation at the ends of each corrugation serving as a drain for liquids to flow into said well.

References Cited by the Examiner

UNITED STATES PATENTS

| | | | |
|---|---|---|---|
| 2,659,096 | 11/1953 | Mencfeldowski | 220—1 X |
| 2,960,255 | 11/1960 | Blane | 229—3.5 X |
| 3,037,677 | 6/1962 | Debs | 229—3.5 X |

FOREIGN PATENTS

| | | |
|---|---|---|
| 11,495 | 1904 | Great Britain. |
| 20,424 | 1904 | Great Britain. |
| 742,484 | 12/1955 | Great Britain. |
| 813,415 | 5/1959 | Great Britain. |

FRANKLIN T. GARRETT, *Primary Examiner.*